(12) United States Patent
Puneet

(10) Patent No.: US 9,178,819 B2
(45) Date of Patent: Nov. 3, 2015

(54) METHOD AND SYSTEM FOR LOOP AVOIDANCE IN A COMMUNICATION NETWORK

(75) Inventor: Sinha Puneet, Bangalore Karnataka (IN)

(73) Assignee: Tejas Networks Limited, Bangalore, Karnataka (IN)

(*) Notice: Subject to any disclaimer, the term of this patent is extended or adjusted under 35 U.S.C. 154(b) by 43 days.

(21) Appl. No.: 13/992,519

(22) PCT Filed: Aug. 11, 2011

(86) PCT No.: PCT/IN2011/000527
§ 371 (c)(1),
(2), (4) Date: Jun. 7, 2013

(87) PCT Pub. No.: WO2012/077126
PCT Pub. Date: Jun. 14, 2012

(65) Prior Publication Data
US 2013/0259051 A1    Oct. 3, 2013

(30) Foreign Application Priority Data
Dec. 9, 2010  (IN) .......................... 3755/CHE/2010

(51) Int. Cl.
*H04L 12/56* (2006.01)
*H04L 12/741* (2013.01)
*H04L 12/42* (2006.01)
*H04L 12/46* (2006.01)
*H04L 12/705* (2013.01)

(52) U.S. Cl.
CPC ............. *H04L 45/745* (2013.01); *H04L 12/42* (2013.01); *H04L 12/462* (2013.01); *H04L 45/18* (2013.01)

(58) Field of Classification Search
USPC ........................................................ 370/392
See application file for complete search history.

(56) References Cited

U.S. PATENT DOCUMENTS

| | | | |
|---|---|---|---|
| 6,879,594 B1* | 4/2005 | Lee et al. ....................... | 370/408 |
| 8,249,065 B2* | 8/2012 | Samprathi ..................... | 370/389 |
| 2002/0009081 A1* | 1/2002 | Sampath et al. ............... | 370/389 |
| 2004/0121648 A1* | 6/2004 | Voros ............................ | 439/535 |
| 2006/0083259 A1* | 4/2006 | Metcalf et al. ................ | 370/458 |
| 2009/0216910 A1 | 8/2009 | Duchesneau | |

OTHER PUBLICATIONS

IEEE Std 802.1Q-2005.*

(Continued)

Primary Examiner — Mark Rinehart
Assistant Examiner — Peter Solinsky
(74) Attorney, Agent, or Firm — Merchant & Gould P.C.

(57) ABSTRACT

The invention relates to a learning-based method for loop avoidance in a packet switched communication network. In one embodiment, this is accomplished by configuring each communication device to maintain a table of unique identifiers, where the unique identifiers include Media Access Control (MAC) address, MAC and Virtual Local Area Network (VLAN) address, Internet Protocol (IP) address or any other unique device identifier, receiving one or more data packet on one or more port of the device, checking the table for unique source identifier of the received data packet, determining whether the received data packet is received from the same port of the device as in the table against the corresponding entry, and updating learned time entry with current system clock time of the device and forwarding the data packet to the next communication device if the packet is received from the same port.

11 Claims, 6 Drawing Sheets

(56) References Cited

OTHER PUBLICATIONS

International Search Report for International Application No. PCT/IN2011/000527 mailed Mar. 20, 2012.

* cited by examiner

METHOD AND SYSTEM FOR LOOP AVOIDANCE IN A COMMUNICATION NETWORK

This application is a National Stage Application of PCT/IN2011/000527, filed 11 Aug. 2011, which claims benefit of Serial No. 3755/CHE/2010, filed 9 Dec. 2010 in India and which applications are incorporated herein by reference. To the extent appropriate, a claim of priority is made to each of the above disclosed applications.

FIELD OF THE INVENTION

The invention generally relates to a communication networks. More particularly, relates to a method and a system to avoid loops in the network in an active topology.

BACKGROUND OF THE INVENTION

Loops in the active topology of bridged networks can lead to severe problems including unicast frame duplication, multicast frame multiplication, and address table nonconvergence. The inability to tolerate active loops is a fundamental limitation to the topology of bridged networks. Such loops must be eliminated to ensure proper network operation. Generically speaking, two approaches have been taken in the past to eliminate loops: manual and automatic configuration.

Manual configuration simply means to configure the passive topology of the network so as to avoid loops. However, it is not always possible or even desirable to manually configure a loop-free topology. Manual configuration of a loop-free topology is generally only acceptable for small networks. Additionally, even in small networks link redundancy may be necessary and therefore small networks may have loops.

Networks may be designed using a plurality of distinct topologies, that is the entities in the network may be coupled together in many different ways. Referring to FIGS. 1, there is shown an example of "ring" topology. A ring topology is a network configuration formed when "Layer 2" bridges are placed in a circular fashion with each node having two and only two ports belonging to a specific ring. FIG. 1 shows a single ring having nodes 110, 120, 130, 140 and 150 connected by communication paths.

Ring topologies shown in FIGS. 1 and 2 present Layer 2 traffic looping problems. As illustrated in FIG. 1, in a single ring topology, data traffic can circulate around in either direction past their origination and thus create repetition of messages. For example, data traffic may originate in node 110, travel counter-clockwise in the ring, pass node 120, 130, 140, 150 and return to node 110; this is called a loop. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

To prevent looping, one of the paths in the ring is blocked, as shown in FIG. 2, by blocking data traffic in one or more of the ring ports; in this case, port 208 is blocked. The port is deemed to be in a "blocking" state, in which it does not learn or forward incoming or outgoing traffic.

Automatic configuration eliminates loops in the active topology of the network by means of a special computer protocol. These protocols are called are management protocol which run over the switch algorithms and create only one active path at a time to avoid loops. One such example of a protocol used for eliminating loops in a network is a Spanning Tree Protocol (STP). The Spanning Tree Protocol (STP) is a Layer 2 protocol designed to run on bridges and switches. The spanning tree is a reduction of the layer 2 network mesh constructed such that packets may be forwarded across the network without any looping.

The STP specification is defined in IEEE 802.1D and RSTP (Rapid Spanning Tree Protocol) is defined in IEEE 802.1w (incorporated into IEEE 802.1D-2004). The main objective of STP is to ensure non occurrence of a loop situation, when redundant paths exists in a network. This objective is achieved in two steps. Initially, STP disables network loops by allowing devices to interact with other STP compliant devices in the network to ensure that only one path exists between any two stations on the network. Subsequent to disabling network loops, STP establishes backup links between switches or bridges along the identified non redundant path in a network. Hence, in achieving the aforementioned objective by the STP, a data packet travelling through the network takes a longer path to reach its destination, inspite of an availability of a shorter path.

For the reasons stated above, which will become apparent to those skilled in the art upon reading and understanding the specification, there is a need in the art for a method and a system to avoid loops in the network in an active topology.

SUMMARY OF THE INVENTION

According to one aspect of the invention there is provided a learning-based method for loop avoidance in a packet switched communication network, wherein the communication network includes plurality of communication devices, the method comprising: configuring each communication device to maintain a table of unique identifiers, wherein the unique identifiers include Media Access Control (MAC) address, MAC and Virtual Local Area Network (VLAN) address, Internet Protocol (IP) address or any other unique device identifier, receiving at least one data packet on at least one port of the device, checking the table for unique source identifier of the received data packet, determining whether the received data packet is received from the same port of the device as in the table against the corresponding entry, and updating learned time entry with current system clock time of the device and forwarding the data packet to the next communication device if the packet is received from the same port.

In another aspect of the invention there is provided a system for loop avoidance in a packet switched communication network, the system comprising: a plurality of communication devices interconnected in an arbitrary topology, and a network channel connected to each of the communication device for transmitting and receiving Continuity Check Message (CCMs), wherein each of the communication device including a plurality of ports for receiving data packets and the device is configured for determining whether the received data packet is received from the same port of the device as in the table against the corresponding entry of each port, calculating difference between current system clock time of the device and learned time of unique identifier of the packet entered in the device table, updating the entry of the identifier in the table with learned port as the port from which the packet has been received and learned time as the current system clock time of the device, if the calculated difference is greater than network convergence threshold, and dropping the packet, if the calculated difference is lesser than the network convergence threshold.

In yet another aspect of the invention there is provided a network communication device, comprising: a processor, a plurality of ports coupled to the processor for receiving data packets, a memory coupled to the processor for storing the received data packets, and a network protocol circuit coupled to the processor, wherein the processor is configured for performing the steps of: determining whether the received data packet is received from the same port of the device as in the table against the corresponding entry of each port, calculating difference between current system clock time of the device and learned time of unique identifier of the packet entered in the device table, updating the entry of the identifier in the table with learned port as the port from which the packet has been received and learned time as the current system clock time of the device, if the calculated difference is greater than network convergence threshold, and dropping the packet, if the calculated difference is lesser than the network convergence threshold.

Additional advantages and features of the present invention will be more apparent from the detailed description and accompanying drawings, which illustrate preferred embodiments of the invention.

DETAIL DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in demonstrative embodiments," "in some embodiment," "in other embodiments," or similar language throughout this specification do not necessarily all refer to the same group of embodiments and the described features, structures, or characteristics may be combined in any suitable manner in one or more embodiments.

Figure 1:
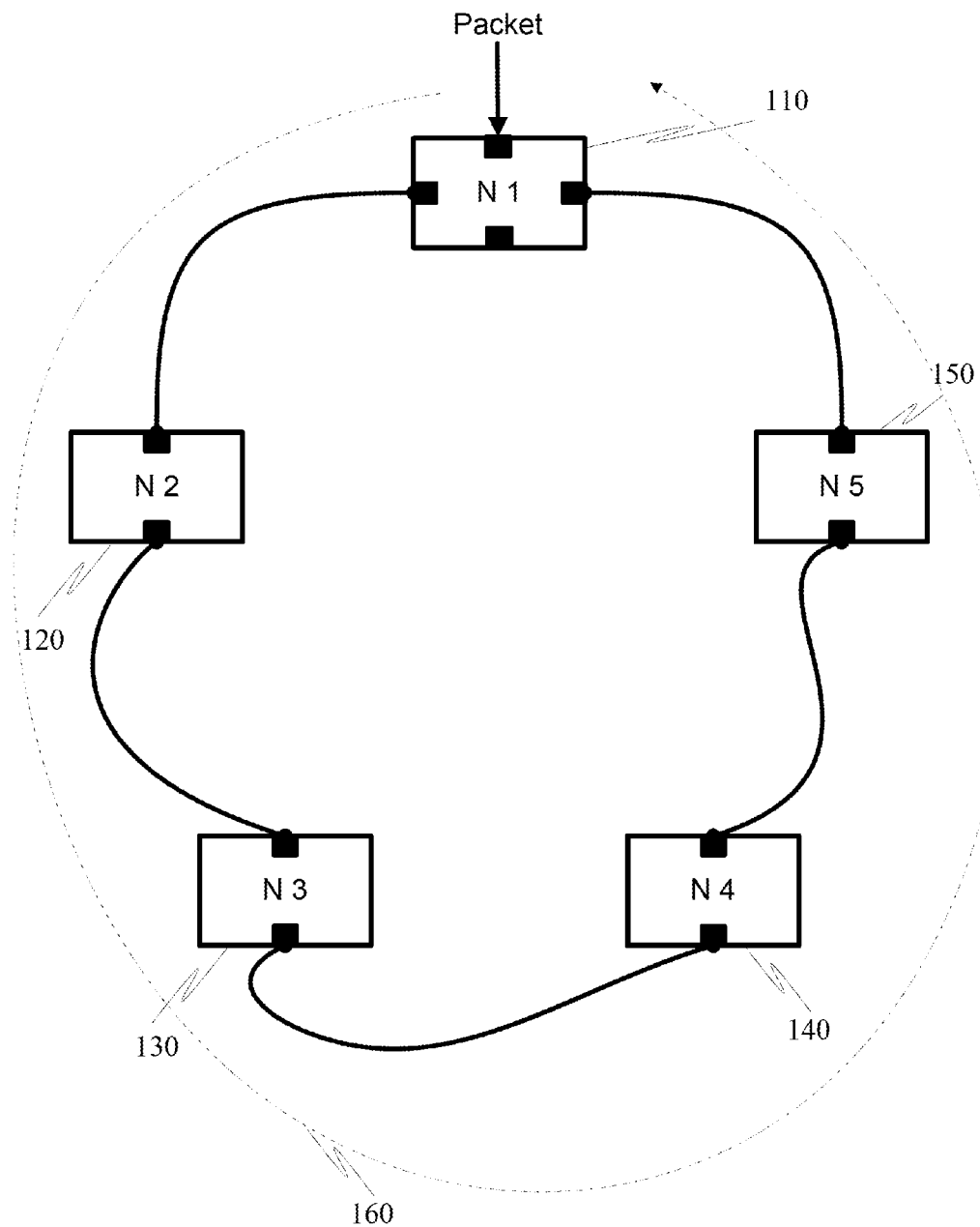
FIG. 1-2 are network diagrams showing a prior art network architectures where an undesired loop has formed.
Figure 2:
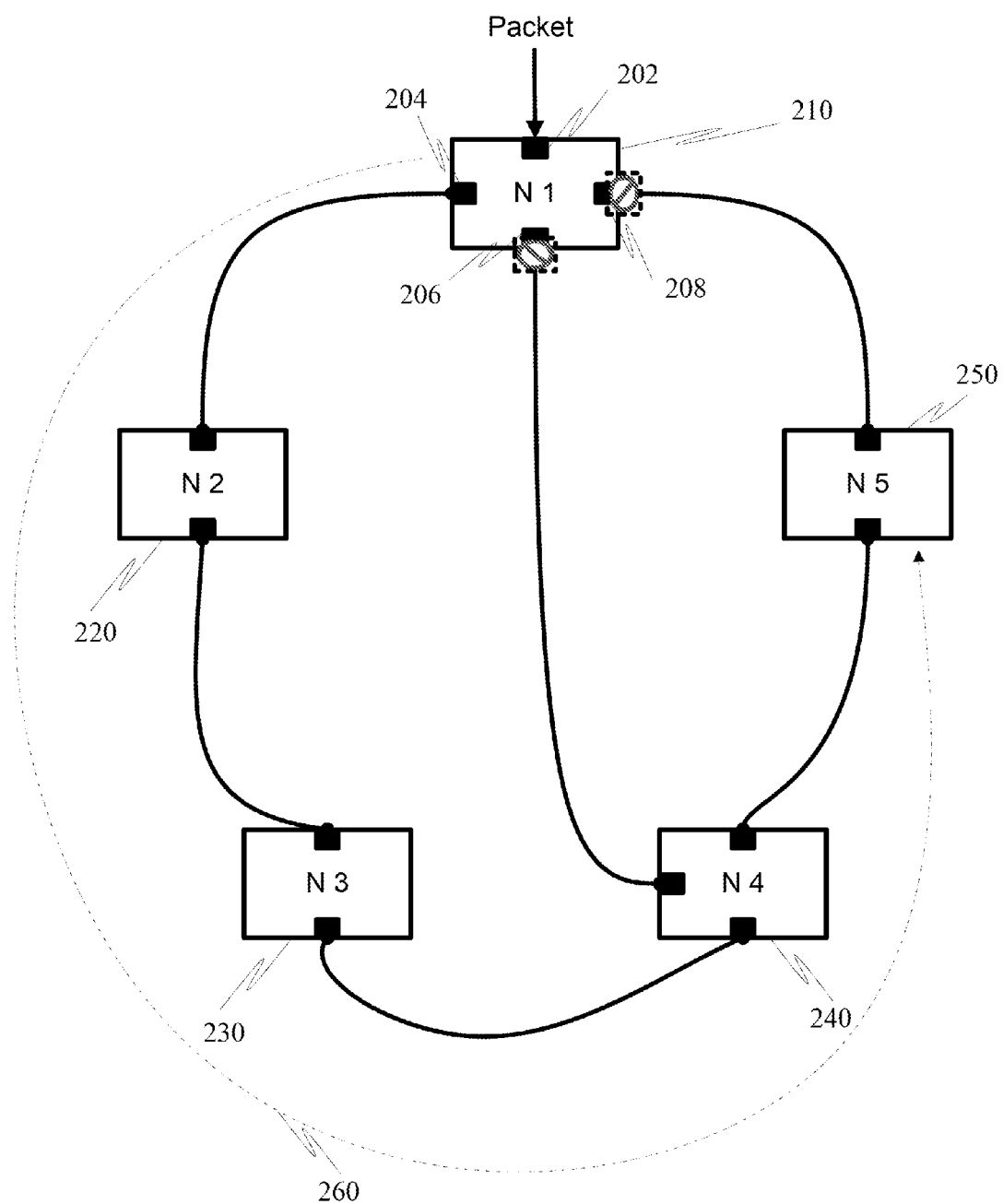
Figure 3:
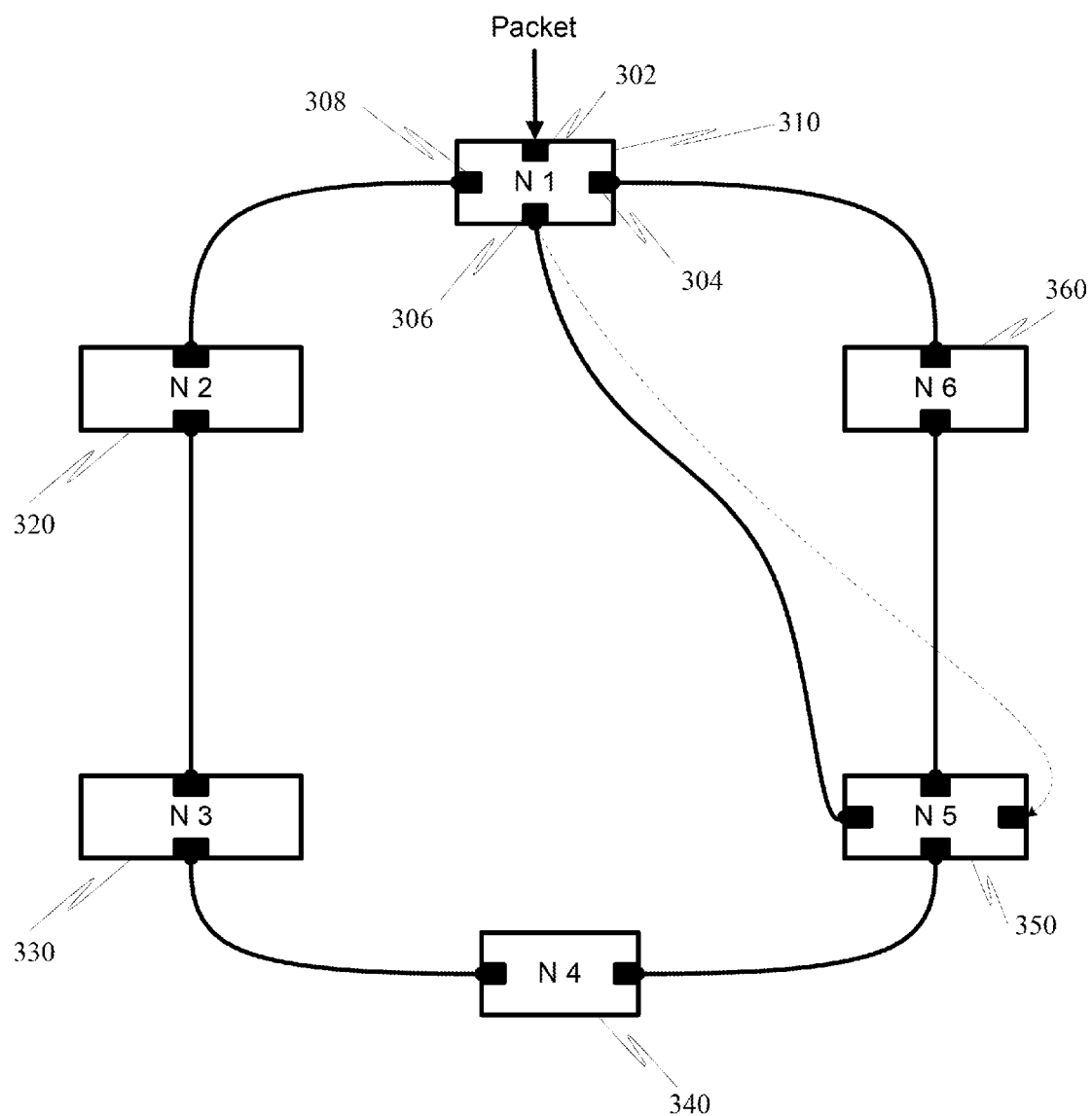
FIG. 3 is a network diagram detailing some of the functioning of one embodiment of the invention.

Referring now to FIG. 3 which shows network system diagram of a packet switch communication network according to an embodiment of the present invention having one more node 360 (or having nodes 310-360) connected in a topology. Each device or nodes or bridges having one or more ports 302-308 which are capable of receiving and forwarding the data frames or packets within a network.

The nodes or bridges or LAN switches rely on packet switching. The switch establishes a connection between two segments and keeps the connection just long enough to send the current packet. Incoming packets, which are part of an Ethernet frame, save to a temporary memory area. The temporary memory area is a buffer. The switch reads the MAC address that is in the frame header and compares the address to a list of addresses in the switch lookup table. In a LAN with an Ethernet basis, an Ethernet frame contains a normal packet as the payload of the frame. The frame has a special header that includes the MAC address information for the source and destination of the packet.

The node switch use one of three methods to route the traffic. One is Cut-through, store and forward and fragment-free. Cut-through switches read the Media Access Control address as soon as a packet is detected or received by the switch. After storing the six bytes that make up the address information, the switches immediately begin to send the packet to the destination address node, even though the rest of the packet is coming into the switch.

The switch which uses store and forward saves the entire packet to the buffer and checks the packet for Cyclic Redundancy Check (CRC) errors or other problems. If the packet has an error, the packet is discarded. Otherwise, the switch looks up the MAC address and sends the packet on to the destination node. Many switches combine the two methods by using cut-through until a certain error level is reached, then changing over to store and forward. Very few switches are strictly cut-through because this provides no error correction.

A less common method is fragment-free. Fragment-free works like cut-through, but stores the first 64 bytes of the packet before sending the packet on. The reason for this is that most errors and all collisions occur during the initial 64 bytes of a packet.

The communication network may be or may include one or more network selected from a group of networks consisting of a layer-2 networks, a local area network, a metropolitan area network, a ring network and the like. The communication channel between the nodes is a uni-directional link or a bi-directional link or both. Unlike after forming a topology, none of the port of the node is blocked to avoid any loop in the network.

In an operation according to one embodiment of the present invention, a data packet is received at the port 302 of the node 310. For example, the received data packet has a source node address and a destination node address. In this example, the destination node is a node connected to the node 350. As soon as the data packet is received at the node 310, the node broadcast or flood the received packet to all other nodes connected in the topology. In this example, the flooded data packet is received at node 320, 330, 340 and 360. There are three different available paths to reach the destination in the topology. One possible path is through the nodes 320, 330, 340 to reach 350, second possible path is through the node 360 to reach 350 and the final possible path is directly to node 350.

In the present invention, each switch or node or bridge working is configured such that each node does not forward same packet from a source, twice, which lead to avoid loops in the network. After servicing a packet from a MAC address, for some amount of time (i.e. Network Convergence Threshold (NCT) described in detail in the below description), If a packet corresponding to the same MAC address is received from a port other than which it is learned on the node, is not serviced. The present configured node is time dependent. For a particular time duration, such packets won't be serviced which will avoid loops. As the node doesn't block any ports, it tends to use shortest path between any two nodes. So it utilizes lesser bandwidth for forwarding a packet from one node in the network to the other. The data packet received at the node 310 is directed towards the node 350, which is the least latency path of all available paths. By use of time stamping at each data packets, there is no loop in the network topology. Also, the present invention provides a low latency path.

Figure 4:
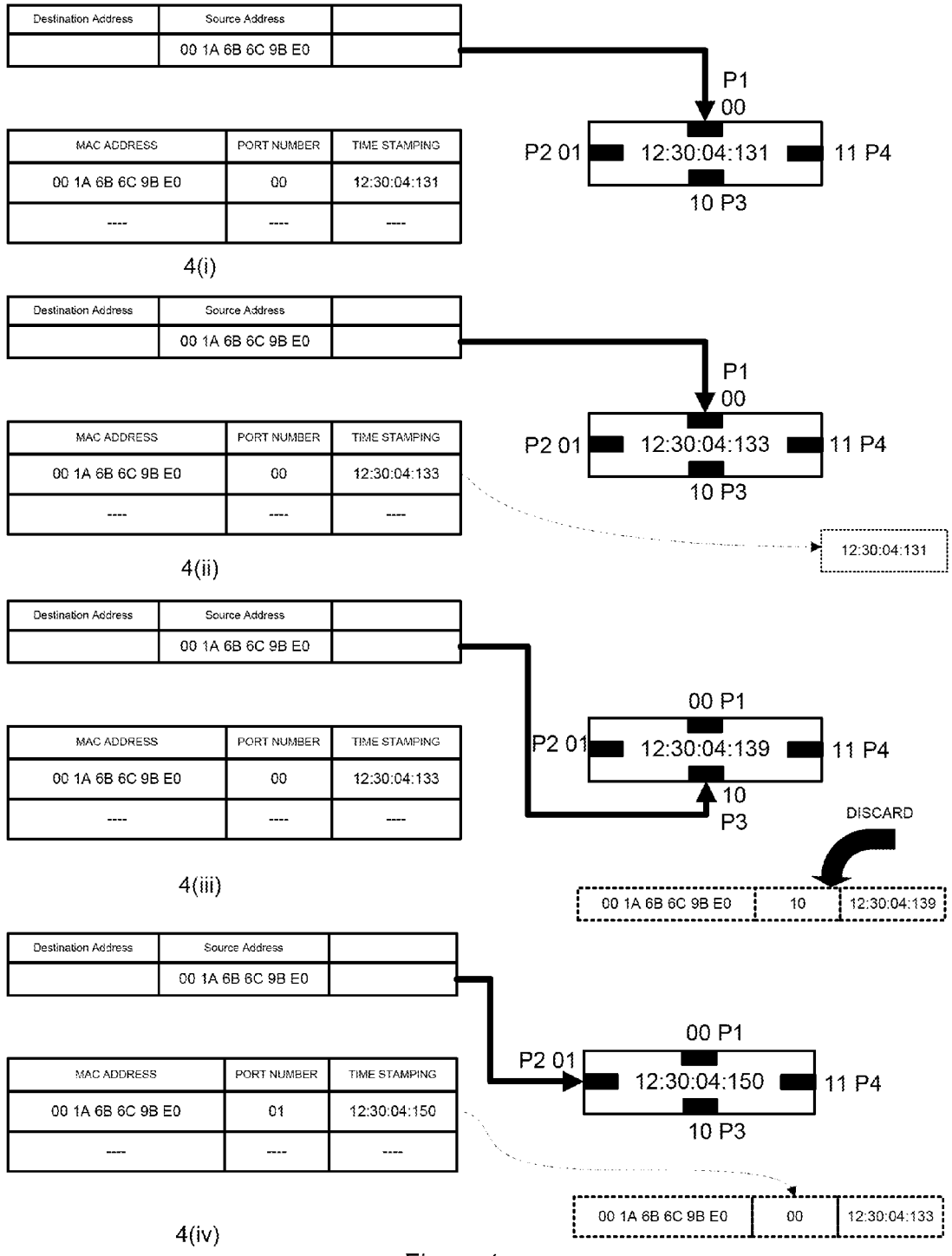
FIG. 4 shows a working of a switch according to one embodiment of the invention.

FIG. 4 shows a working of a switch according to one embodiment of the invention. In one example mode of operation, the switch having four ports P1, P2, P3 and P4 (00, 01, 10, and 11). The port P1 (00) receives a data packet, where the data packet has Source MAC Address as 00 1A 6B 6C 9B E0, at time 12:30:04:131 Since the data packet is received with the source MAC address which is not present in the table, a fresh entry is added in the table with at least three information values as shown in FIG. 4(*i*). The look up table has also other entries like VLAN ID etc, which is not shown in the drawings.

At FIG. 4(*ii*), the switch receives a second data packet in the same port P1 (00), the switch checks for the source MAC Address 00 1A 6B 6C 9B E0. Since the packet is received with a source MAC address which is present in the table, on the same port as learned in the table, the time information value of this entry is updated by the current system time of the switch. In the present case, the switch updates the time entry of the data packet as 12:30:04:133.

At FIG. 4(*iii*), the switch receives a third data packet at the port P3 (10). The switch checks for the source MAC Address. As the packet received with the source MAC address which is present in the table, but the port in the table corresponding to this entry is different from the port at which this packet is received, Also, the switch calculates the difference between current system clock time of the device and the learned time of the unique identifier entered in the table of the communication device. A time value parameter i.e. Network Convergence Threshold (NCT) is configured on each switch to determine whether the MAC address has to re-learnt with the port or not.

If the port is different, the time value will be checked as if the difference value of the present system time of the switch and time information value in the table for this entry is less than the "Network Convergence Threshold", the packet will be dropped and the entry won't be learnt. If the difference value of the present system time of the switch and the time information value of the table is greater than the "Network Convergence Threshold", the entry will be updated on new port with the present system time of the switch and the packet will be forwarded. In the present case, if the "Network Convergence Threshold" is set to be 10 ms, and the received data packet time at the system is 12:30:04:139. Then the difference value of the present system time of the switch and time information value in the table for this entry (i.e.) (12:30:04:139-12:30:04:133=6 ms) which is less than the "Network Convergence Threshold" i.e. (10 ms). So, in the present case, the data packet will be dropped which is shown in FIG. 4(*iii*).

At FIG. 4(*iv*) the switch receives a fourth data packet in the port P2 (01), the switch checks for the source MAC Address 00 1A 6B 6C 9B E0. Since the packet is received with the same source MAC address which is present in the table with a different port at which the packet is received. If the port is different, then the time value will be checked by the difference value of the present system time of the switch and the time information value present in the table. In the present case, if the "Network Convergence Threshold" is set to be 10 ms, and the received data packet time at the system is 12:30:04:150. The difference value of the present system time of the switch and time information value in the table for this entry (i.e.) (12:30:04:150-12:30:04:133=17 ms) which is greater than the "Network Convergence Threshold" i.e. (10 ms). So, in the present case, the data packet will be forwarded and the table will be learnt with the fresh entry of ports and time, as shown in FIG. 4(*iv*). This is to support station movement in a network.

Figure 5:
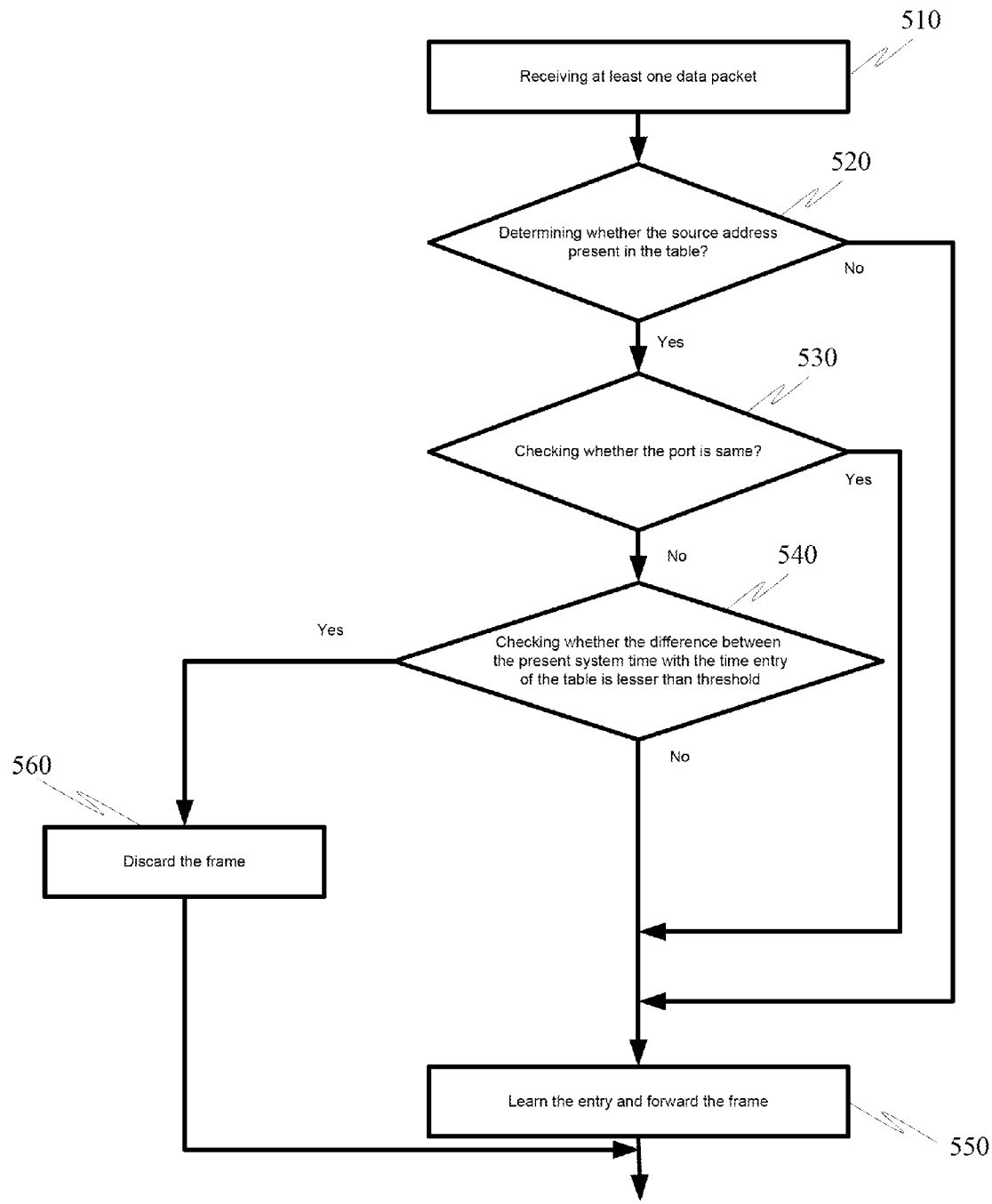
FIG. 5 is a flow chart of a learning-based method for loop avoidance in a packet switched communication network in accordance with one embodiment of the invention.

FIG. 5 shows a learning-based method for loop avoidance in a packet switched communication network according to an embodiment of the invention. At least some part of the method may be implemented as a computer program stored on a computer-readable medium, such as firmware, for execution by a processor. Referring now to FIG. 5, the learning-based method for loop avoidance in a packet switched communication network, where the communication network having one or more communication devices connected in an arbitrary topology.

At step 510, the method receives a data packet from one or more communication devices. The communication devices are configured to maintain a table of unique identifiers, where the unique identifiers include but not limited to Media Access Control (MAC) address, MAC and Virtual Local Area Network (VLAN) address, Internet Protocol (IP) address or any other unique device identifier. The step of configuring includes setting a threshold time interval in the communication device, wherein the threshold time interval is a Network Convergence Threshold (NCT).

At step 520, the method determines whether the received data packet has source MAC address (checking the table for unique source identifier), present in look up table, maintained in the communication device.

At step 530, the method determines whether the received data packet is from the same port of the communication device as in the table against the corresponding entry of the source identifier.

At step 540, the method calculates the difference between current system clock time of the device and the learned time of the unique identifier entered in the table of the communication device and determines whether it is less than NCT.

At step 550, the method learns/updates the entry corresponding to the unique identifier of the packet. (To achieve the same, it can be done by explicitly updating the parameter which have changed or by discarding the previous entry and learning a fresh entry).

At step 560, the method discards the frame or packet, if the calculated difference is less than the network convergence threshold.

Although the method flowchart includes steps 510-560 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 6:
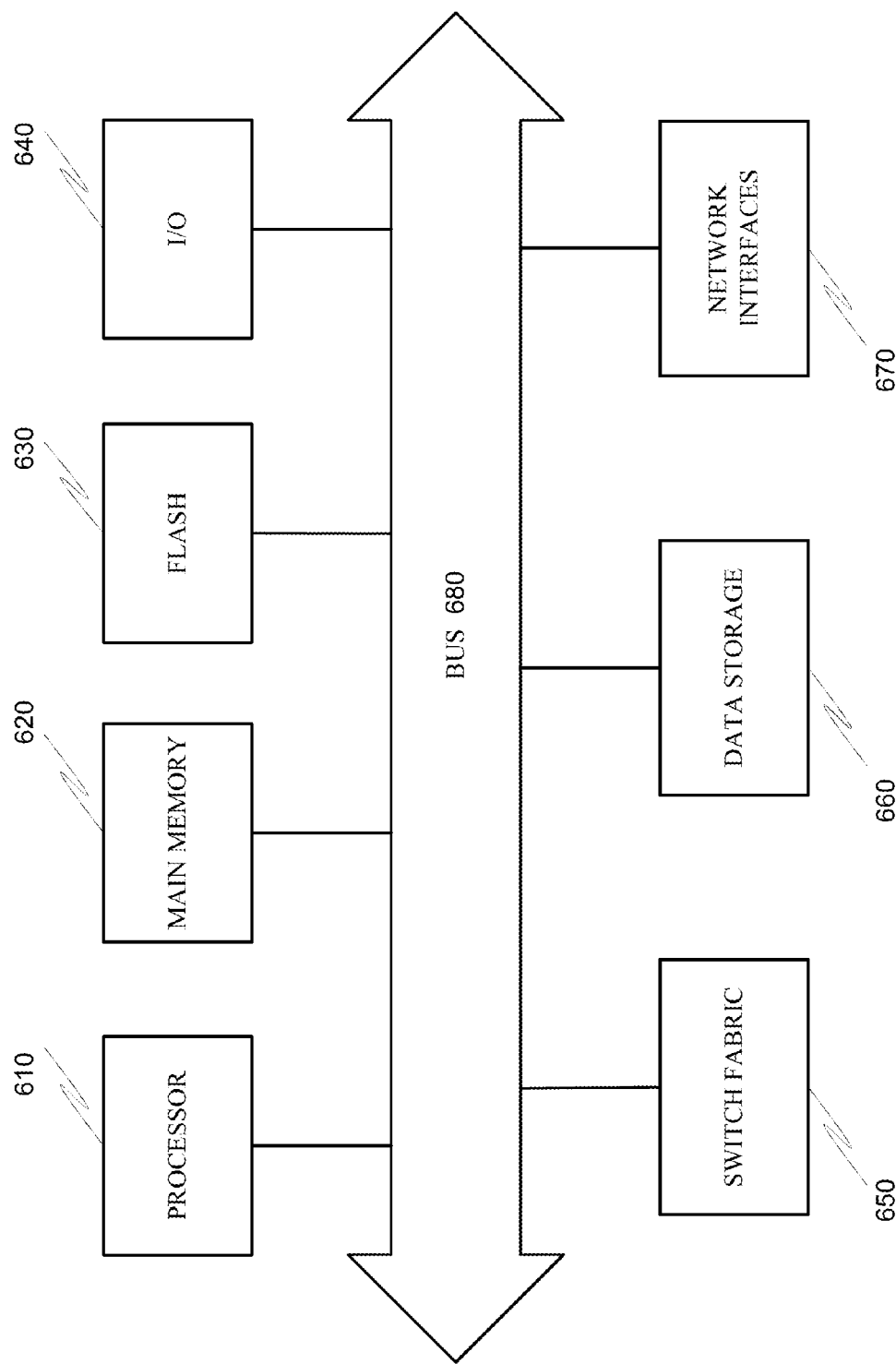
FIG. 6 illustrates one embodiment of a suitable computing environment in which certain aspects of the invention illustrated in FIGS. 3-5 may be practiced.

In the illustrated embodiment of FIG. 6, the learning-based method for loop avoidance in a packet switched communication network, wherein the communication network includes plurality of communication devices, according to the present invention as discussed above may be implemented as a series of software routines run by computer system of FIG. 6. These software routines comprise a plurality or series of instructions to be executed by a processing system in a hardware system, such as processor 610 of FIG. 6. Initially, the series of instructions are stored on a data storage device 660, memory 620 or flash 630. It is to be appreciated that the series of instructions can be stored using any conventional computer-readable or machine-accessible storage medium, such as a diskette, CD-ROM, magnetic tape, DVD, ROM, etc. It is also to be appreciated that the series of instructions need not be stored locally, and could be stored on a propagated data signal received from a remote storage device, such as a server on a network, via a network/communication interface 670. The instructions are copied from the storage device 660, such as mass storage, or from the propagated data signal into a memory 620 and then accessed and executed by processor 610.

In alternate embodiments, the present invention is implemented in discrete hardware or firmware. For example, one or more application specific integrated circuits (ASICs) could be programmed with the above-described functions of the present invention.

Accordingly, a learning-based method and a system for loop avoidance in a packet switched communication network is described. From the foregoing description, those skilled in the art will recognize that many other variations of the present invention are possible. In particular, while the present invention has been described as being implemented in a metropolitan area network comprising multiple nodes or switches, it should be noted that some of the logic described herein may be distributed in other components of a network or implemented in a network of different scope such as a local area network without departing from the scope of the present invention.

FIGS. 1-6 are merely representational and are not drawn to scale. Certain portions thereof may be exaggerated, while others may be minimized. FIGS. 1-6 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

I claim:

1. A learning-based method for loop avoidance in a packet switched communication network, wherein the communication network includes plurality of communication devices, the method comprising:
   creating at a communication device a table of unique identifiers corresponding to received data packets, wherein the unique identifiers comprises at least one of the following associated with the received data packets: Media Access Control (MAC) address, MAC and Virtual Local Area Network (VLAN) address;
   setting a network convergence threshold time for the communication device;
   receiving a first data packet on a first port of the communication device;
   determining a first identifier associated with the received first data packet, the first identifier comprising a first MAC address of an originating communication device for the first data packet;
   determining whether the table of identifiers comprises a first entry for the determined first identifier of the received first data packet;
   determining in response to determining that the table of identifiers comprise the first entry for the first identifier, a learned port and a learned time from the first entry;
   determining, in response to determining that the table comprises the first entry for the first identifier, whether the first port associated with the received first data packet is same as the learned port;
   calculating, in response to the first port not being same as the learned port, a difference between a current system clock time of the communication device and the learned time; and
   updating the first entry in the table of identifiers based on the calculated difference, wherein updating the first entry comprises:
      updating the learned time of the first entry as the current system clock time, and
      updating the learned port of the first entry with the first port of the communication device.

2. The method of loop avoidance in a communication network as claimed in claim 1, wherein the network convergence threshold time is user defined.

3. The method of loop avoidance in a communication network as claimed in claim 1, further comprising:
   dropping the first data packet, if the calculated difference is lesser than the network convergence threshold time.

4. The method of claim 1, further comprising:
   receiving a second data packet at the first port of the communication device; and
   determining the source communication device associated with the second data packet.

5. The method of claim 4, further comprising:
   determining a second identifier associated with the received second data packet from the determined source communication device;
   determining whether the second identifier is same as the first identifier;
   forwarding the second data packet to a destination address associated with the second data packet; and
   updating, in response to determining that the second identifier is same as the first identifier, the first entry in the table of entry for the first identifier.

6. The method of claim 5, wherein updating the first entry comprises:
   determining the current system clock time at the receipt of the second data packet; and
   updating the learned time in for the first identifier as the determine current system clock time in the table if identifiers.

7. A system for loop avoidance in a packet switched communication network, the system comprising:
   a plurality of communication devices interconnected in an arbitrary topology; and
   a network channel connected to each of the communication device for transmitting and receiving Continuity Check Message (CCMs),
   wherein each of the communication device of the plurality of communication devices comprises including a plurality of ports for receiving data packets, and wherein the communication device is configured to:
      set a threshold time interval for received data packets at the communication device, wherein the threshold time interval is a Network Convergence Threshold (NCT) time;
      receive a first data packet at a first port of the plurality of ports;
      determine a first identifier associated with the received first packet, the first identifier comprising the first identifier of a source communication device for the first data packet;
      determine whether a first entry for the determined first identifier exits in a table of identifiers at the first communication device;
      determine, in response to determining that the first entry for the first identifier exists, a learned time and a learned port from the table of identifiers;
      determine whether the first port associated with the received first data packet is same as the learned port determined from the table of identifiers;
      determine, in response to determining that the first port is not same as the learned port, a difference between a current system clock time of the communication device and the learned time from the table of identifiers;
      update the first entry corresponding to the identifier in the table based on the determined difference, wherein updating the first entry comprises:
         update the learned time of the first entry as the current system clock time, and
         update the learned port in the first entry with the first port of the communication device; and
      process the first data packet based on the calculated time, wherein processing the first data packet comprises dropping the first data packet, if the calculated difference is lesser than the network convergence threshold time.

8. The system as claimed in claim 7, wherein the communication network comprises at least one of the following: a layer-2 networks, a local area network, a metropolitan area network, and a ring network.

9. The system as claimed in claim 7, wherein the communication channel between the communication device is at least one of the following: a uni-directional link and a bi-directional link, and wherein the communication device is a ATM switch, Ethernet Switch or a RPR switch.

10. A network communication device, comprising:
    a plurality of ports for receiving data packets;
    a memory coupled to the plurality of ports for storing the received data packets; and
    a network protocol circuit configured to:
       set a threshold time interval for the communication device, wherein the threshold time interval is a Network Convergence Threshold (NCT) time;
       determine a first identifier associated with a first data packet received at a first port of the communication device;
       determine whether a first entry exists for the first identifier in a table of identifiers stored at the communication device;
       determine, in response to determining that the first entry exists in the table of identifiers, a learned port and a learned time from the first entry;
       determine whether the first port corresponding to the received first data packet same as the learned port determined from the table of identifiers;
       calculate, in response to the first port not being same as the learned port, a difference between a current system clock time of the communication device and the learned time the first identifier of the first data packet entered in the table of identifiers;
       update the entry of the identifier in the table of identifiers based on the calculated difference, wherein the processing unit being configured to update the entry comprises the processing unit being configured to:
          update the learned time of the entry as the current system clock time, and
          update the learned port to be the first port of the communication device; and
       process the first packet based on the calculated time wherein processing the first packet comprises dropping the first data packet, if the calculated difference is lesser than the network convergence threshold time.

11. The network communication device as claimed in claim 10, wherein the memory includes a main memory and a flash memory.

* * * * *